United States Patent
Loher et al.

(10) Patent No.: US 8,549,571 B2
(45) Date of Patent: Oct. 1, 2013

(54) VIDEO STREAMING METHOD AND SYSTEM

(75) Inventors: Darren Paul Loher, Arvada, CO (US); Ori Pessach, Erie, CO (US)

(73) Assignee: EnVysion, Inc., Louisville, CO (US)

(*) Notice: Subject to any disclaimer, the term of this patent is extended or adjusted under 35 U.S.C. 154(b) by 0 days.

(21) Appl. No.: 12/882,456

(22) Filed: Sep. 15, 2010

(65) Prior Publication Data

US 2011/0063500 A1    Mar. 17, 2011

Related U.S. Application Data

(60) Provisional application No. 61/242,566, filed on Sep. 15, 2009.

(51) Int. Cl.
*H04N 7/173* (2011.01)
*H04N 5/232* (2006.01)

(52) U.S. Cl.
USPC .................................... 725/105; 348/211.3

(58) Field of Classification Search
None
See application file for complete search history.

(56) References Cited

U.S. PATENT DOCUMENTS

| | | | |
|---|---|---|---|
| 5,884,042 A | | 3/1999 | Winter et al. |
| 7,143,432 B1* | | 11/2006 | Brooks et al. .................. 725/105 |
| 7,936,372 B2* | | 5/2011 | Murakami et al. ......... 348/207.1 |
| 8,010,631 B2* | | 8/2011 | Brailean et al. ................ 709/219 |
| 2006/0070111 A1* | | 3/2006 | Kurosawa ..................... 725/105 |
| 2007/0024706 A1 | | 2/2007 | Brannon, Jr. et al. |
| 2007/0044010 A1 | | 2/2007 | Sull et al. |
| 2008/0040444 A1 | | 2/2008 | Angquist et al. |
| 2010/0289904 A1* | | 11/2010 | Zhang et al. ............... 348/207.1 |

OTHER PUBLICATIONS

Lee W Young, "International Search Report", Dec. 16, 2010, Publisher: International Searching Authority, Published in: USA.
Lee W. Young, "Written Opinion ", Dec. 16, 2010, Publisher: International Searching Authority, Published in: USA.
Nickitas-Etienne, Athina, International Preliminary Report on Patentability re International Application No. PCT/US2010/048939, Mar. 20, 2012, p. 10 Published in: PCT.

* cited by examiner

*Primary Examiner* — Luong T Nguyen
(74) *Attorney, Agent, or Firm* — Neugeboren O'Dowd PC

(57) ABSTRACT

One embodiment comprises a method of streaming video data comprising, outputting video data from a video capture device comprising a first video resolution, determining a desired viewable area of the video data, removing a first portion of the video data comprising video data outside of the desired viewable area, and streaming the video data comprising the desired viewable area to a client device.

20 Claims, 7 Drawing Sheets

VIDEO STREAMING METHOD AND SYSTEM

CROSS REFERENCE TO RELATED APPLICATION

This application is based upon, and claims priority to U.S. Provisional Patent Application No. 61/242,566, entitled System and Method for Network Video Streaming, filed Sep. 15, 2009. The entirety of such provisional patent application, including all exhibits and appendices are incorporated herein by reference.

FIELD OF THE INVENTION

The present invention relates to viewing video data across a network. In particular, but not by way of limitation, the present invention relates to video streaming from a high resolution video capture device over limited bandwidth.

BACKGROUND OF THE INVENTION

Viewing video data across a network is becoming increasingly popular as devices adapted to view video data are increasingly connected to greater and greater network bandwidth. In the past decade, the proliferation of broadband, 3G, and other high-datarate networks has enabled the increasing popularity of video websites such as, but not limited to, YouTube. As the bandwidth capabilities increase, the ability to view higher resolution video data is also increased, which enables the ability to view an increasing amount of detail in the video.

Over this same time period, the resolution of electronic displays such as, but not limited to, monitors and televisions has also increased, along with the resolution of video capture devices such as digital video cameras. Unfortunately, even with the increase in network bandwidth that is available to many client devices, users are unable to view video streamed from video capture devices at the full resolution and display capabilities of the video capture device due to network limitations. As such, if a user wishes to stream a video across a network from a video capture device to a client device, oftentimes only a lower-resolution image may be available. It is therefore desirable to have the ability to receive and display high resolution video from a video capture device across a network.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

One embodiment of the present invention may be characterized as a method of streaming video data. One method comprises outputting video data from a video capture device. The video data may comprise a first video resolution. The method also includes determining a desired viewable area of the video data and removing, from the video data, a first portion of the video data located outside of the desired viewable area. The method then includes streaming the video data comprising the desired viewable area to a client device.

Another embodiment of the invention may be characterized as a video system that includes a video capture device, a storage device, a server, and at least one client device that may comprise a video player. One video capture device is adapted to supply a live video data stream. The storage device is communicatively coupled to the video capture device and adapted to store the video data. The server is adapted to retrieve the video data from the storage device and provide one of one or more viewable areas of the video data to the at least one client device. The video data may be provided upon receiving a request from the at least one client device to view the one or more viewable areas of the video data. The at least one client device may comprise a video player adapted to receive the one or more viewable areas of the video data.

Yet another embodiment of the invention may be characterized as a non-transitory, tangible computer readable storage medium, encoded with processor readable instructions to perform a method of streaming a video. One such method of streaming a video comprises requesting to view a main video stream comprising a maximum first resolution and subsequently receiving and displaying the main video stream at a second resolution that is less than the maximum first resolution. Co-ordinates of a first cropped video stream are then chosen. One first cropped video stream comprises a portion of the main video stream. The first cropped video stream is then requested to be received, a first portion of the main video stream outside of the first cropped video is removed from the main video stream and the first cropped video stream is subsequently received and displayed at a third resolution that may be greater than the second resolution.

And another embodiment of the invention may be characterized as a video streaming apparatus comprising a video capture device, a video storage device, and a client device. The video capture device is adapted to output video data comprising a first video resolution and a first video viewable area. One video storage device is adapted to store the video data. The client device is adapted to receive a stream of the video data at a second video resolution and the first video viewable area, with the second video resolution comprising a resolution that is less than the first video resolution. The client device is also adapted to request to receive the stream of the video data at the first video resolution and at a second video viewable area, the second video viewable area comprising a portion of the first video viewable area.

BRIEF DESCRIPTION ON THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout FIGS. 1-6 and wherein:

DETAILED DESCRIPTION

Figure 1:
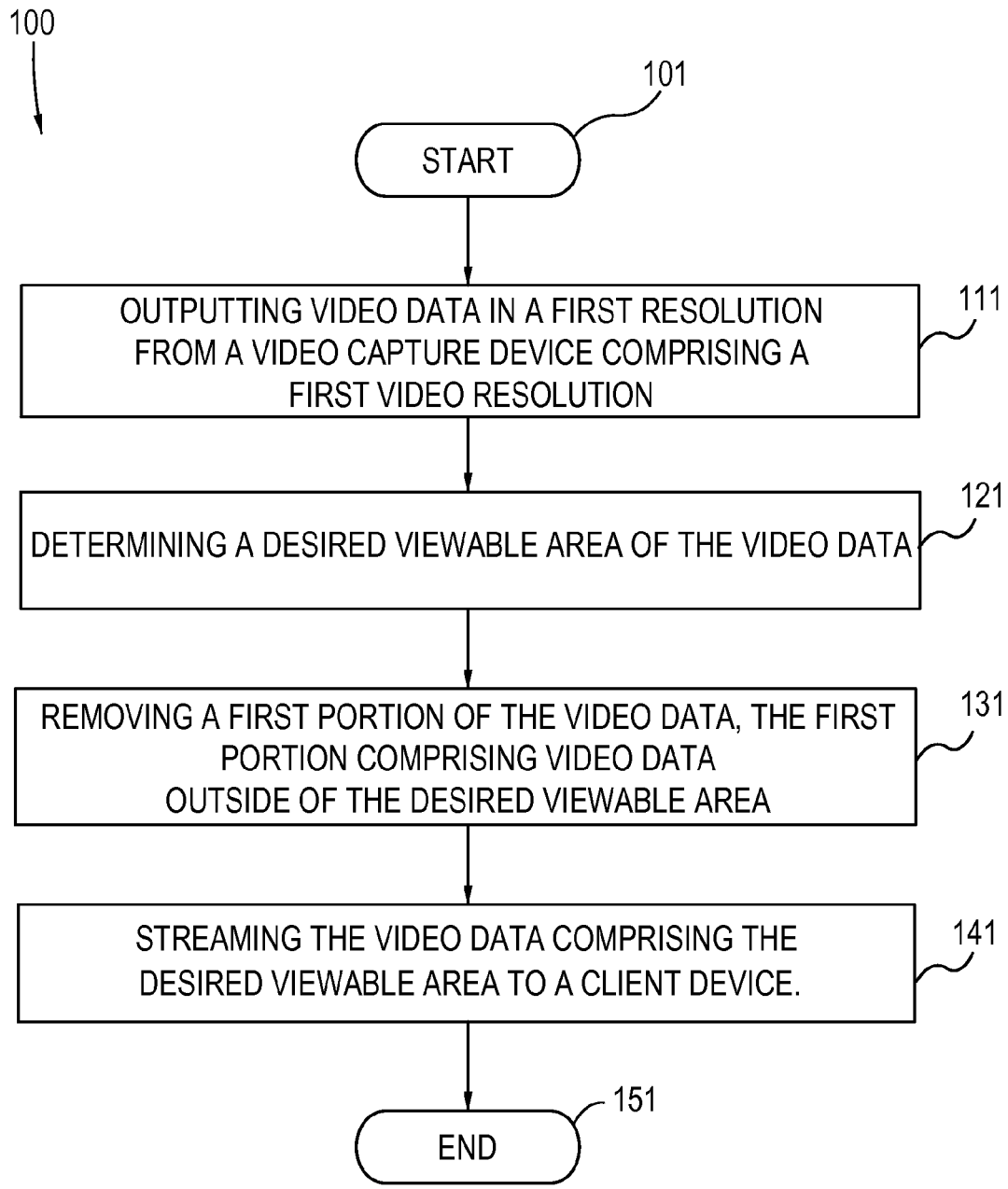
FIG. 1 illustrates a flowchart that depicts a method that may be carried out in connection with the embodiments described herein.
Figure 2:
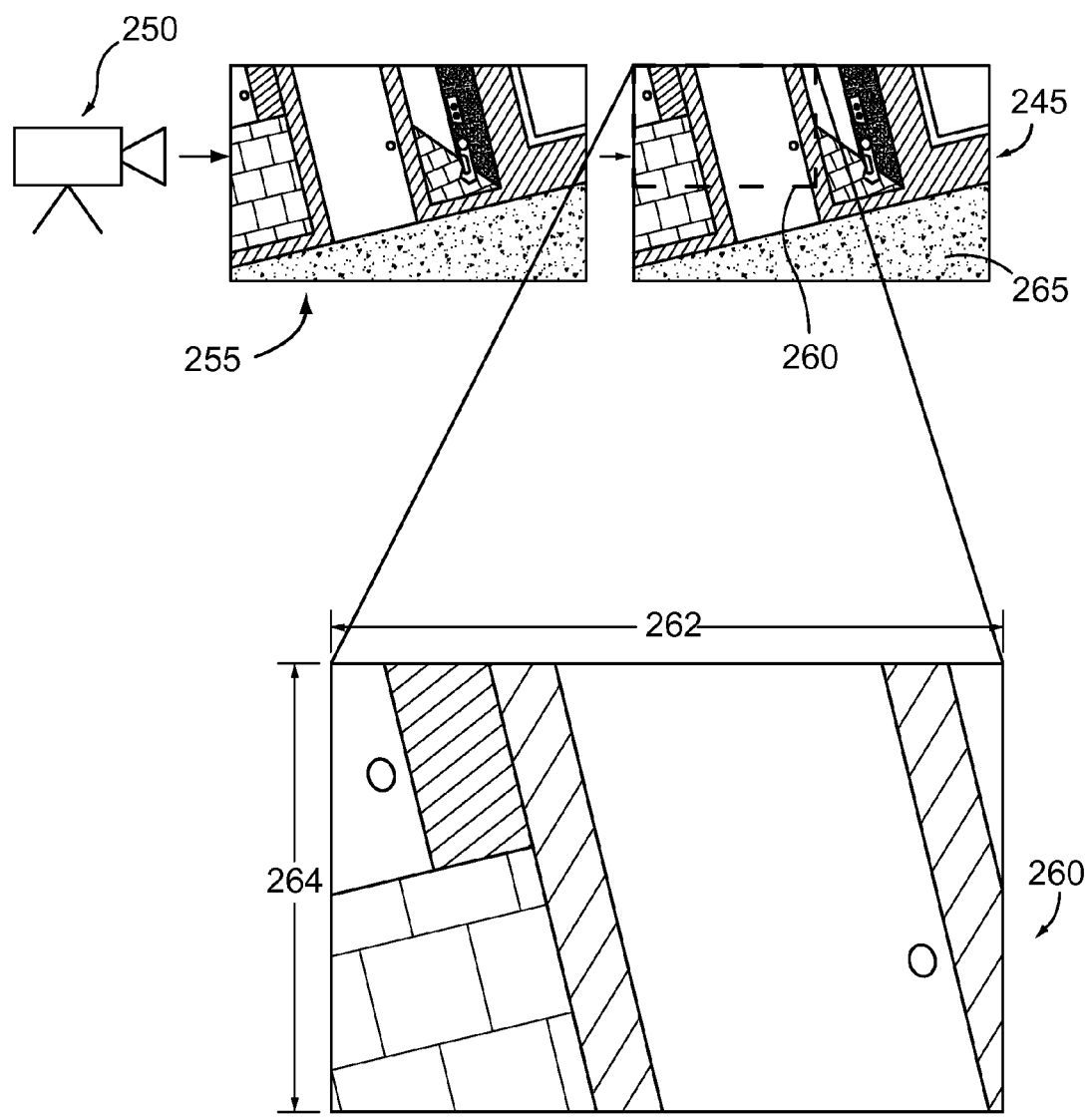
FIG. 2 is a depiction of a video capture device output according to the embodiments described herein.

Referring first to FIG. 1, shown is a method of streaming video data. The method starts at 101 and at 111 comprises outputting video data from a video capture device at a first resolution. One type of video capture device may comprise a high definition digital video camera, such as, but not limited to, a security camera adapted to provide video at a 1920×1080 or, 1080 p, resolution. However, it is contemplated using other types of video capture devices that may be adapted to provide a resolution greater than and less than 1920×1080. One other resolution may comprise a 720 p resolution. Furthermore, the term "video capture device" may comprise more than one type of device. For example, one video capture device may comprise a digital video camera, a video data storage device, and a device adapted to supply the video data across a network such as, but not limited to, a server. Throughout the application the term "server" may be used interchangeably with the term "video server." It is also contemplated implementing more than one of each type of device in various embodiments. Seen in FIG. 2 is a representation of a single video capture device 250 adapted to output video data at a first resolution 255. As discussed below, the video data at the first resolution 255 may be converted to video data at a second resolution 245 that comprises a lower resolution than the first resolution 255 in order for the video data to be displayed without significant buffering through a network connection such as, but not limited to, a broadband DSL network connection.

At 121, one method 100 comprises determining a desired viewable area of the video data. For example, as seen in FIG. 2, one desired viewable area 260 comprises an upper-left quadrant of the video data at the second resolution 245. In one method, determining the desired viewable area 260 of the video data occurs after receiving and displaying at least one frame of the video data at the second resolution 245 on the electronic display. In such a method, a user may manually choose the desired viewable area 260 through selecting the desired viewable area 260 on the display of the video data at the second resolution 245 with a computer mouse. Alternatively, the viewable area 260 may be chosen by any other method known in the art such as, but not limited to, providing vertical and horizontal image start and end positions of the desired viewable area 260. For example, pixel start and end positions may be provided as the vertical and horizontal start and end positions. Other types of image co-ordinates may also be provided. The co-ordinates may be provided before or after the at least one frame of the video data at the second resolution 245 is displayed.

However the viewable area 260 is determined, at element number 131 of the method 100 seen in FIG. 1, upon determining the desired viewable area 260, a first portion 265 of the video data located outside of the desired viewable area 260 may be removed from the video data. In one embodiment, the video server 590 seen in FIG. 5 may remove the first portion 265 by cropping and resizing the video data. One first portion 265 of the video data may also be referred to as a video data section 265 and may substantially comprise the entire video data located outside of the desired viewable area 260. At 141, the method 100 comprises streaming the video data comprising the desired viewable area 260 and not including the video data section 265 to the client device. In one embodiment, the video data may be streamed to a client device comprising a video player. The method 100 ends at 151.

Figure 3:
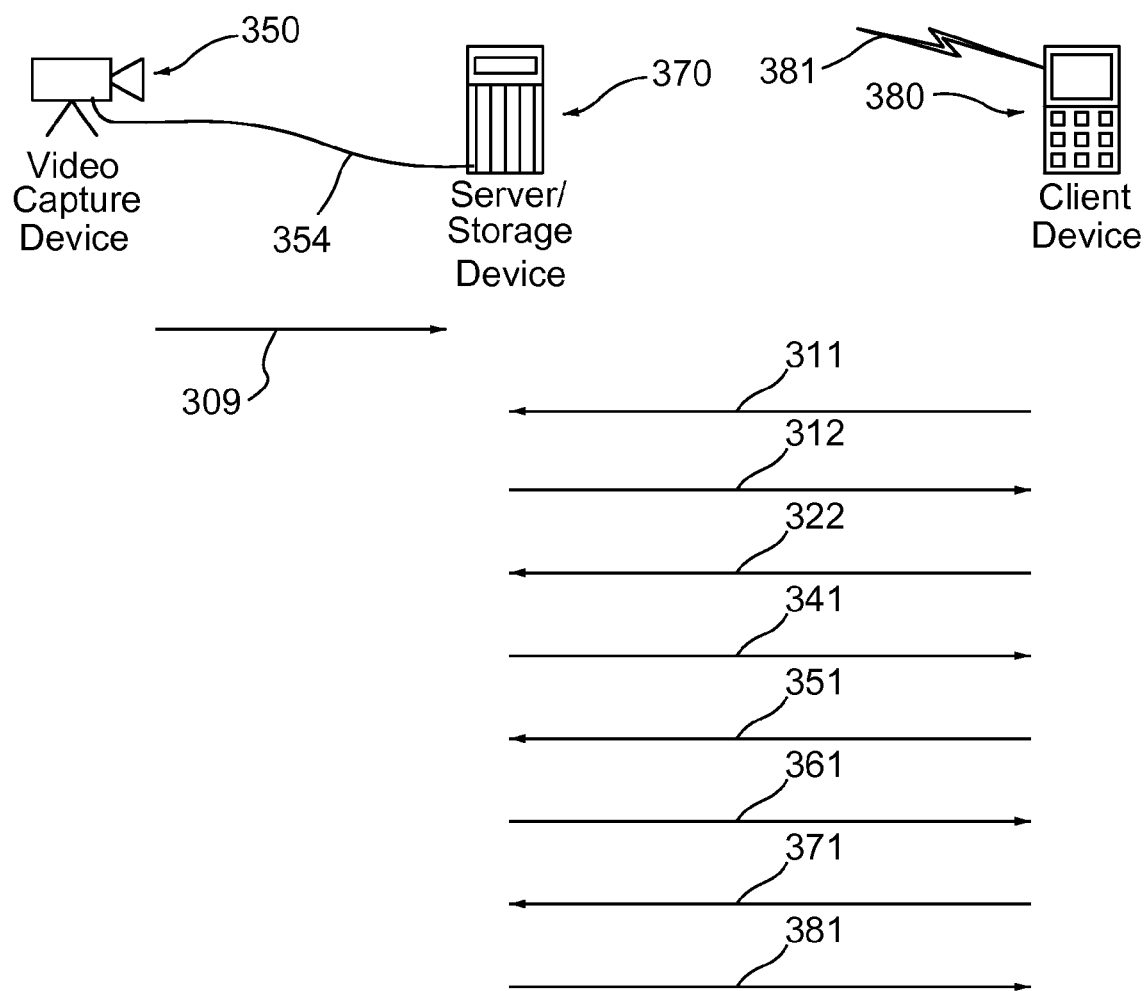
FIG. 3 illustrates the communication between a video capture device, a video storage device/server, and a client device in connection with the embodiments described herein.

Seen in FIG. 3 is one representation of the communication between a video capture device 350 and a client device 380 in requesting and receiving the video data. As seen, at 309, one video capture device 350 may output video data at the first resolution 255. The video data at the first resolution 255 may be sent to a storage device 370 that may also comprise a video server. For example, the video capture device 350 may be electronically coupled to the storage device through a cable 354 using an analog encoding method such as NTSC or the video capture device 350 may provide the storage device 370 with the video data through a network such as, but not limited to, an Internet Protocol (IP) network over a wireless 802.11 WiFi transport. The storage device 370 may store the video data to a video storage medium such as, but not limited to, memory components adapted to receive digital video data. In another example, the video storage device and video capture device may be integrated together into a single unit where the connection 354 is a communications bus inside the integrated video capture device 350/storage device 370.

The client device 380 may then request 311 to view the video data from the video capture device 350 by communicating with the storage device 370. However, due to limitations in the network between the storage device 370 and the client device 380, the client device 380 may be unable to receive the video data at the first resolution 255. It is also contemplated that the client device 380 may request the video data direct from the video capture device 350 and that network limitations between the video capture device 350 and client device 380 may prevent the client device 380 from receiving the video data at the first video resolution 255. When the client device 380 requests 311 to receive the video data, in one embodiment, the storage device 370 responds 312 with video data at the second resolution 245 comprising a resolution less than the first resolution. The second resolution may be established through communication between the user device 380 and the storage device 370. The communication between the user device 380 and storage device 370 establishing the second resolution may comprise communication known in the art that is adapted to provide the client device with the video data at the maximum resolution allowable for a network bandwidth between the client device 380 and the video storage device 370. Since the second resolution 245 may be lower than the first resolution 255, video data may be supplied to the client device 380 at the second resolutions by "dropping" pixels in the video data. Therefore, the number of pixels in a video data width 262 and height 264 at the second resolution 245 is less than the number of pixels in a video data width 262 and height 264 in the video data at the first resolution 255. Therefore, in one embodiment, the second resolution 245 may comprise a 640×480 image.

Upon receiving the video data at the second resolution and choosing the desired viewable area 260, in one embodiment, a request communication 322 may be sent from the client device 380 to the storage device 370. One request communication 322 may comprise dimensions of the viewable area 260. In reply 341 to the request communication 322, the storage device 370 may provide the video data comprising the desired viewable area 260 to the user device 380. In one embodiment, the video comprising the desired viewable area 260 may comprise a scaling the video to a third resolution that is greater than the second resolution. For example, since the desired viewable area 260 is only a portion of the video data at the second resolution 245, the desired viewable area 260 comprises less total pixels than the total number of pixels in the video data at the second resolution 245. Therefore, fewer pixels may be dropped in providing the desired viewable area 260 video data to the client device 380. As such, the resolution of one desired viewable area 260 may comprise a resolution relative to 1024×768 in one embodiment. However, it is contemplated that a user may be able to select a desired viewable area 260 and receive the desired viewable area 260 video data at the first resolution. Therefore, by receiving only a portion of the video data in the first resolution 255, one desired viewable area 260 may comprise a resolution relative to 1920×1080. Like the second resolution, the third resolution may be set by communication known in the art between the client device 380 and the storage device 370. The communication between the client device 380 and the storage device 370 may set the second resolution and the third resolution at the greatest display resolution possible, up to the limit of the resolution being output from the video capture device 350, which in this example is 1920×1080. As seen in FIG. 2, by selecting a desired viewable area 260, the display of the video data on the client device 380 may appear to be a "zoom" of the video data output by the video capture device 250.

Figure 4:
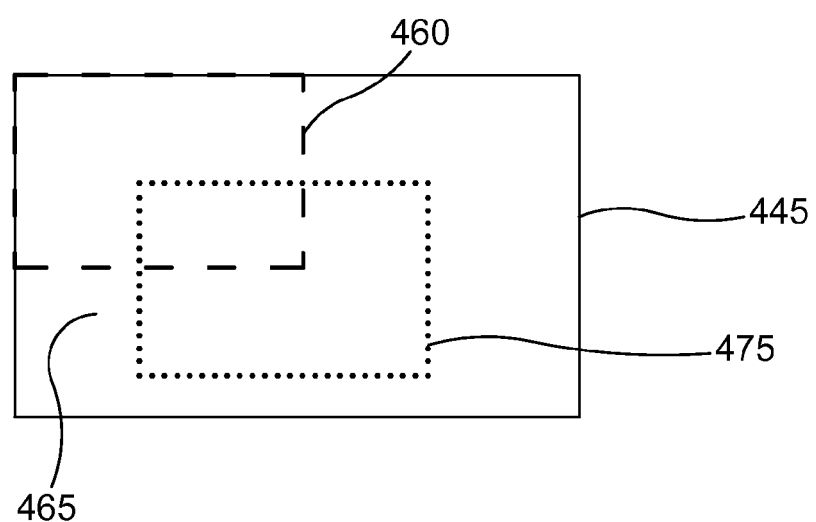
FIG. 4 is a representation of a plurality of desired viewable areas of video data according to the embodiments described herein.

As seen in FIG. 4, a user may change the desired viewable area 460 to a new desired viewable area 475. For example, in one embodiment, upon receiving the desired viewable area 460, the user of a client device 380 may wish to pan and zoom to a new area of the video data at the second resolution 445. In one embodiment, the user of the client device 380 may provide coordinates of the new desired viewable area 475 to the video storage device 370 in a request message 351 in a manner similar to requesting the desired viewable area 460. The video storage device 370 may then remove the video data located in the video data section 465 outside of the new desired viewable area 475 and send the video data substantially comprising only the new desired viewable area video data in a response message 361. Alternatively, in one embodiment the request message 351 may comprise a request to view the video data at the second resolution 445 and the response message 361 may provide the video data at the second resolution 445. In such an embodiment, the user may then select the new desired viewable area 475. The request 371 for the new desired viewable area may then be sent to the storage device 370 and the storage device may then provide the video data comprising the new desired viewable area 475 to the client device 380 in the reply 381. Multiple requests for new desired viewable areas 475 may be made. Furthermore, in one embodiment, a client device 380 may substantially simultaneously receive the desired viewable area 460 and one or more new desired viewable areas 475.

Figure 5:
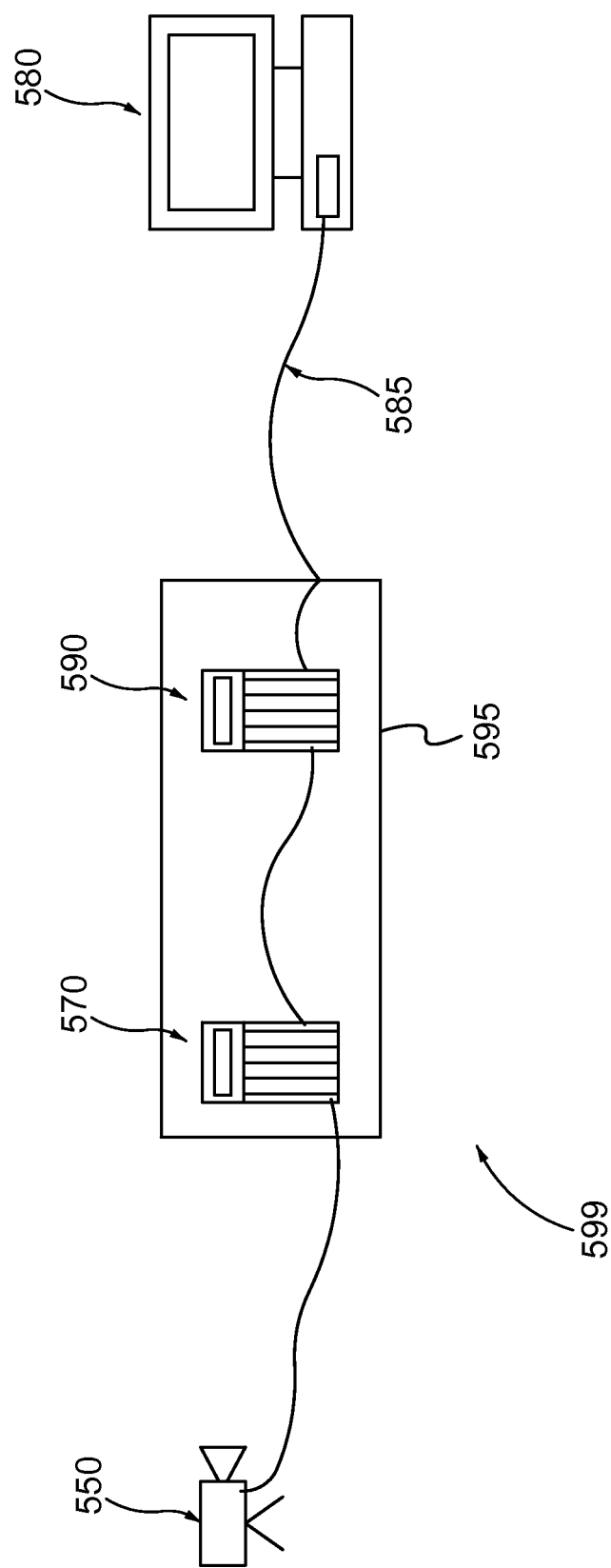
FIG. 5 is a representation of a data streaming apparatus and a video system according to the embodiments described herein.

Turning now to FIG. 5, seen is one embodiment of the invention comprising a data streaming system 599. One data streaming system 599 may stream video data, be referenced as a video streaming system 599 or a video system and may comprise at least one video capture device 550, storage device 570, video server 590, and client device 580. The at least one video capture device 550, storage device 570, video server 590, and client device 580 are similar to the devices described with reference to FIGS. 1-4. For example, the at least one video capture device 550 is adapted to provide a video stream comprising video data, the at least one storage device 570 is adapted to store the video stream comprising the video data, and the at least one video server 590 may be communicatively coupled to the storage device 570 and adapted to provide one of one or more viewable areas of the video data to the at least one client device 580 upon receiving a request from the client device 580 to view the one or more viewable areas of the video data. The client device 580 may comprise a video player adapted to display the video data and may be further adapted to receive the one or more viewable areas of the video data. As seen, the at least one storage device 570 and the at least one video server 590 may comprise a single device 595 in an embodiment.

Referring now also to FIG. 4, in one embodiment, the at least one client device 580 may be adapted to dynamically select one or more viewable areas 460, 475 of the video data. As previously explained, the one or more viewable areas 460, 475 may be chosen by selecting each of the one or more viewable areas 460, 475 with a mouse or by entering image co-ordinates of the one or more viewable areas 460, 475. Therefore, a user may dynamically choose the dimensions of the one or more viewable areas 460, 475, "on-the-fly". A user may or may not choose to end a viewing session of one of the one or more viewable areas 460, 475 before requesting to view another of the one or more viewable areas 460, 475.

The video server 590 is adapted to provide the one or more viewable areas 475, 460 of the video data upon receiving a request from the at least one client device 580 to receive the one or more viewable areas 475, 460 of the video data. For example, the requests 351, 371 described above may be sent by the at least one client device 580 to view one or more viewable areas 475, 460. The requests 351, 371 from the at least one client device 580 to receive the one or more viewable areas 475, 460 of the video data comprises sending one or more commands to the video server comprise a scale level and one or more co-ordinate values. Furthermore, the video server 590 may comprise (i) a video encoding server adapted to store video data from at least one video capture device 550 in a video storage medium, and (ii) a video streaming server adapted to scale and crop the video data stored in the video storage medium. Therefore, although the video may be streamed at a lower quality and resolution, the video data may continued to be stored and the maximum quality and resolution. Furthermore, any and all portions of the video data may be streamed over any network capacity, or even variable network capacity.

Figure 6:
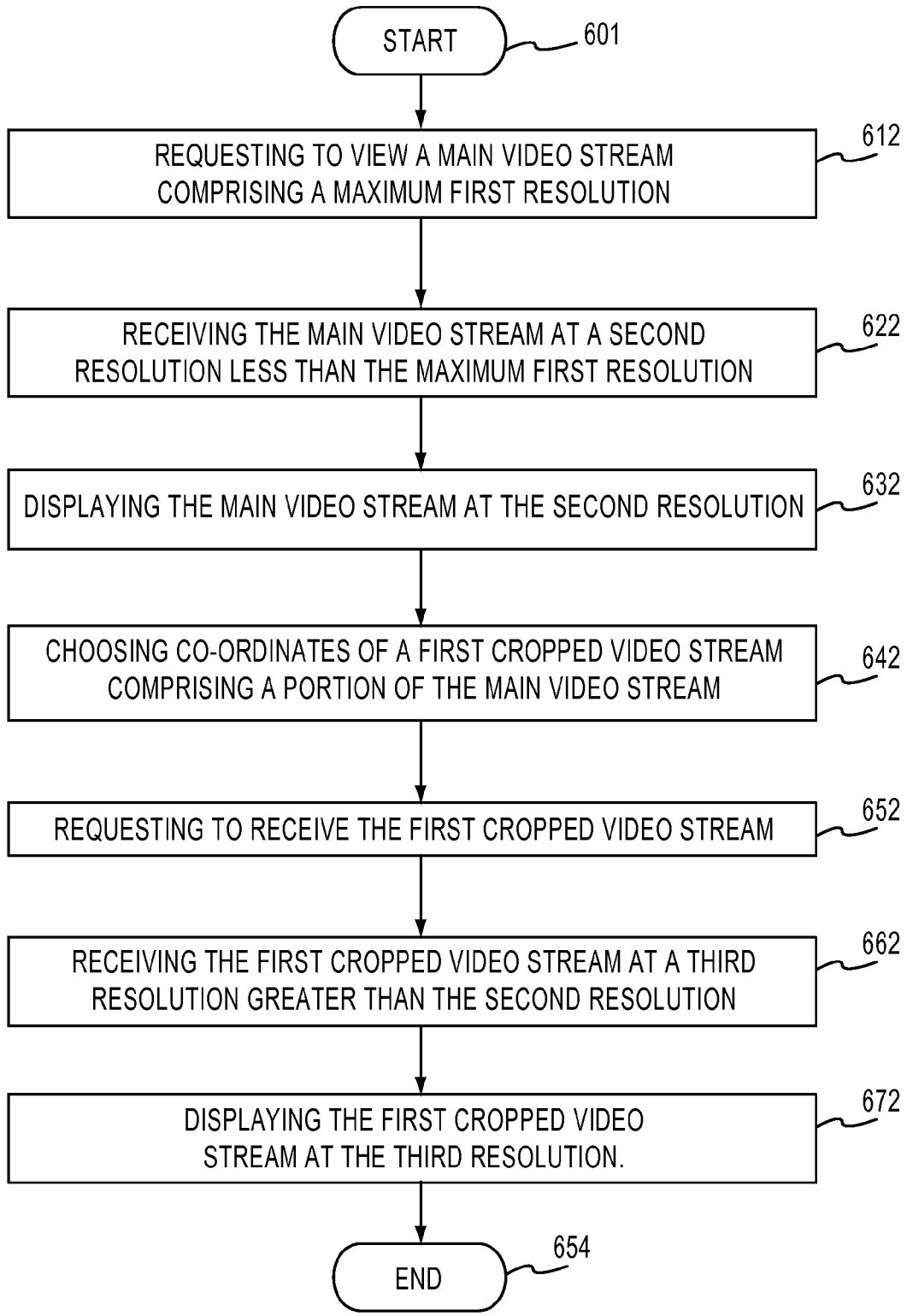
FIG. 6 illustrates a flow chart that depicts a method that may be carried out in connection with the embodiments described herein.

Moving on now to FIG. 6, seen is a method of streaming a video adapted to be performed by non-transitory, tangible computer readable storage medium, encoded with processor readable instructions. At 612, one method comprises requesting to view a main video stream comprising a maximum first resolution. In one method, the main video stream comprising a maximum first resolution may comprise the video data at the first resolution 255 seen in FIG. 2. At 622, one method comprises receiving the main video stream at a second resolution less than the maximum first resolution. The second resolution may comprise the video data at the second resolution 445. At 632, one method comprises displaying the main video stream at the second resolution. At 642, the method comprises choosing co-ordinates of a first cropped video stream comprising a portion of the main video stream. A first cropped video stream may comprise the desired viewable area 460 seen in FIG. 4. At 652, the method comprises requesting to receive the first cropped video stream and at 662 the method comprises receiving the first cropped video stream at a third resolution greater than the second resolution. The third resolution may comprise the third resolution described with reference to FIGS. 2-4. At 672, the method comprises displaying the first cropped video stream at the third resolution.

One method adapted to be performed by non-transitory, tangible computer readable storage medium, encoded with processor readable instructions may also comprise choosing the co-ordinates of a second cropped video stream that may comprise a portion of the main video stream. One second cropped video stream may comprise the new desired viewable area 475 seen in FIG. 4. A client device may request, receive, and display the second cropped video stream at a fourth resolution greater than the second resolution. For example, the second cropped video stream may comprise an area smaller than the first cropped video stream. Choosing the coordinates of a second cropped video stream may also comprise choosing a scale level.

FIG. 5 may also comprise a video streaming apparatus. One video streaming apparatus comprises the video capture device 550, video storage device 570, video streaming server 590 and client device 580. The video capture device 550 is adapted to output video data comprising a first resolution and a first viewable area which may be similar to the video data at the first resolution 255. The video storage device 570 is adapted to store the video data at the first resolution and the first viewable area. The client device is adapted to request a first video stream from the video streaming server 590. The video streaming server 590 sends a first video stream of the video data to the client device 580 at a second resolution and first viewable area, the second resolution comprising a resolution less than the first video resolution. The first video stream may comprise the video data at the second resolution 445. The client device may also be adapted to request to receive a second video stream of the video data at the first resolution and a second viewable area where the second viewable area comprises a portion of the first video viewable area. The second video stream may comprise the desired viewable area 460. Furthermore, it is contemplated that a datarate of the second video stream may be substantially the same as a datarate of the video data at the first video resolution and first video viewable area. Additionally, the first video resolution may comprise a high definition video resolution that may be supplied over a limited network between the client device and the network storage device. The first resolution video from the video capture device 550 may be encoded at a rate that is many times larger than the network 585 capacity between the video storage device 595 and the client 580. For example, the video capture device may be encoding video at a rate of 3 Mbps while the network capacity to the client device 580 is only 384 Kbps.

Figure 7:
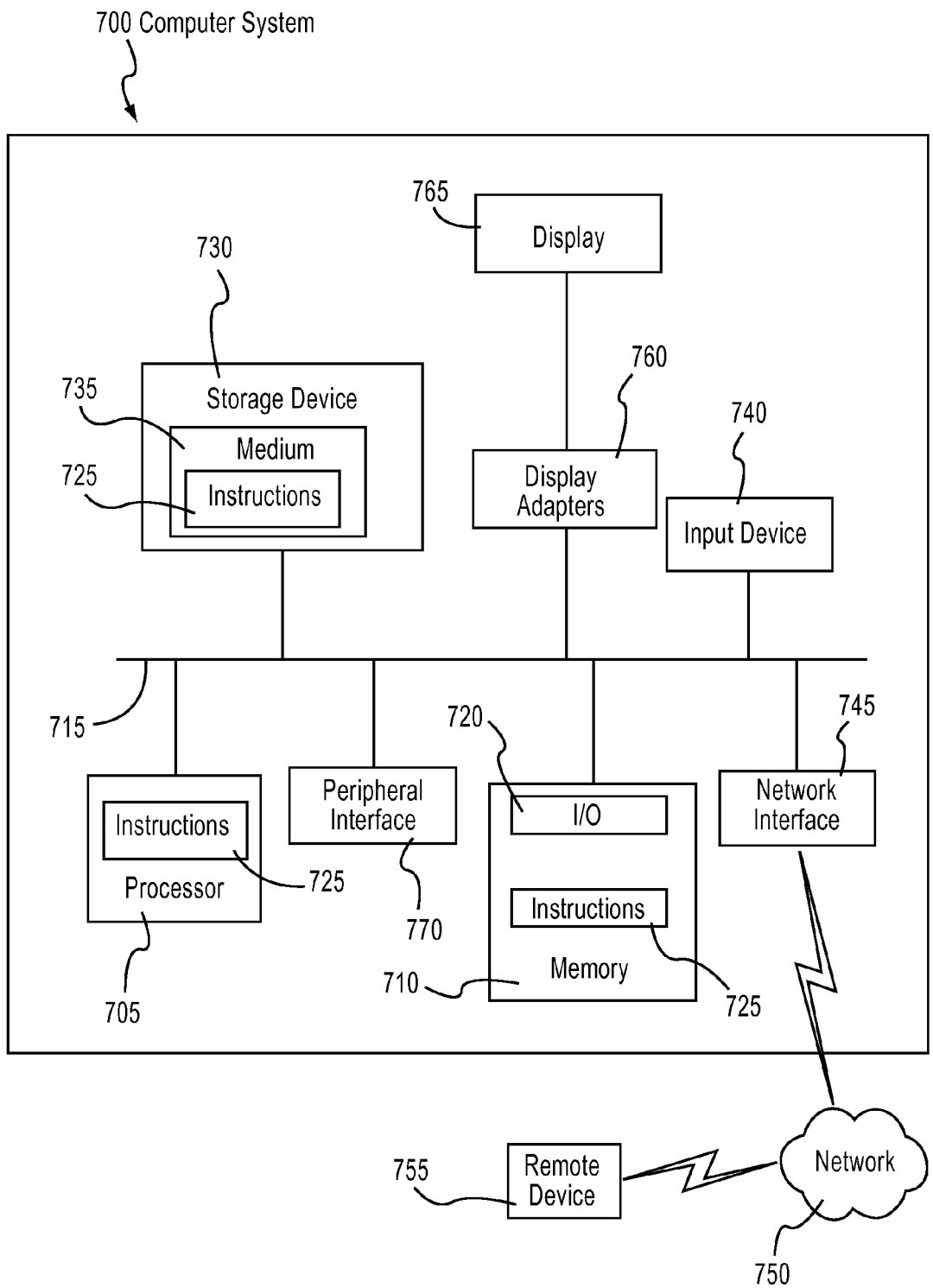
FIG. 7 is a representation of one embodiment of a machine in an exemplary form of a computer system according to the embodiments described herein.

FIG. 7 shows a diagrammatic representation of one embodiment of a machine in an exemplary form of a computer system 700 within which a set of instructions for causing the device to perform any one or more of the aspects and/or methodologies of the present disclosure may be executed. Computer system 700 includes a processor 705 and a memory 710 that communicate with each other, and with other components, via a bus 715. Bus 715 may include any of several types of bus structures including, but not limited to, a memory bus, a memory controller, a peripheral bus, a local bus, and any combinations thereof, using any of a variety of bus architectures.

Memory 710 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 720 (BIOS), including basic routines that help to transfer information between elements within computer system 700, such as during start-up, may be stored in memory 710. Memory 710 may also include (e.g., stored on one or more machine-readable media) instructions (e.g., software) 725 embodying any one or more of the aspects and/or methodologies of the present disclosure. In another example, memory 710 may further include any number of program modules including, but not limited to, an operating system, one or more application programs, other program modules, program data, and any combinations thereof.

Computer system 700 may also include a storage device 730. Examples of a storage device (e.g., storage device 730) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 730 may be connected to bus 715 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 730 may be removably interfaced with computer system 700 (e.g., via an external port connector (not shown)). Particularly, storage device 730 and an associated machine-readable medium 935 may provide nonvolatile and/or volatile storage of machine-readable instructions, data structures, program modules, and/or other data for computer system 700. In one example, software 725 may reside, completely or partially, within machine-readable medium 735. In another example, software 725 may reside, completely or partially, within processor 705. Computer system 700 may also include an input device 740. In one example, a user of computer system 700 may enter commands and/or other information into computer system 700 via input device 740. Examples of an input device 740 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 740 may be interfaced to bus 715 via any of a variety of interfaces (not shown) including, but not limited to, a serial interface, a parallel interface, a game port, a USB interface, a FIREWIRE interface, a direct interface to bus 715, and any combinations thereof.

A user may also input commands and/or other information to computer system 700 via storage device 730 (e.g., a removable disk drive, a flash drive, etc.) and/or a network interface device 745. A network interface device, such as network interface device 745 may be utilized for connecting computer system 700 to one or more of a variety of networks, such as network 750, and one or more remote devices 755 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 750, may employ a wired and/or a wireless mode of communication. In general, any network topology may be used. Information (e.g., data, software 725, etc.) may be communicated to and/or from computer system 700 via network interface device 745.

Computer system 700 may further include a video display adapter 760 for communicating a displayable image to a display device, such as display device 765. A display device may be utilized to display any number and/or variety of indicators related to pollution impact and/or pollution offset attributable to a consumer, as discussed above. Examples of a display device include, but are not limited to, a liquid crystal display (LCD), a cathode ray tube (CRT), a plasma display, and any combinations thereof. In addition to a display device, a computer system 700 may include one or more other peripheral output devices including, but not limited to, an audio speaker, a printer, and any combinations thereof. Such peripheral output devices may be connected to bus 715 via a peripheral interface 770. Examples of a peripheral interface include, but are not limited to, a serial port, a USB connection, a FIREWIRE connection, a parallel connection, and any combinations thereof. In one example an audio device may provide audio related to data of computer system 700 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 765. Accordingly, a digitizer may be integrated with display device 765, or may exist as a separate device overlaying or otherwise appended to display device 765.

Finally, the term "scaling" is used throughout the application as a factor applied to determine how many pixels, if any, are dropped between the original source video image and the desired video image. For example, scaling may be performed in FIG. 2 from the first resolution 255 to the second resolution 245 in order to reduce the bandwidth used to send the entire viewable image. Therefore, a lower, second resolutions 245 is used to send the image; e.g.: scaling is what is being performed in all the examples between the "first resolution" and the "second resolution". Furthermore, cropping and changing the scale of the video image is what is being performed on all the examples describing the "third resolution" to the "fourth resolution."

What is claimed is:

1. A method of streaming video data comprising:
   outputting video data in a first resolution from a video capture device;
   determining a desired viewable area of the video data by, receiving the video data at a client device,
      displaying an image on the client device at a second resolution, wherein, the second resolution is lower than the first resolution, and
      selecting a portion of the image by,
         using one or more video width start pixel position co-ordinates, video width end pixel position co-ordinates, video height start pixel position co-ordinates, and video height end pixel position co-ordinates to provide:
         a first video width start position,
         a first video width end position,
         a first video height start position,
         a first video height end position,
         one or more second video width start positions,
         one or more second video width end positions,
         one or more second video height start positions, and
         one or more second video height end positions, wherein,
            a difference between a first video width start pixel position and a first video width end pixel position comprises a first video pixel width;
            a difference between a second video width start pixel position and a second video width end pixel position comprises a second video pixel width,
            a difference between a first video height start pixel position and a first video height end pixel position comprises a first video pixel height,
            a difference between a second video height start pixel position and a second video height end pixel position comprises a second video pixel height, and
            at least one of,
               the second video pixel width is less than the first video pixel width, and
               the second video pixel height is less than the first video pixel height;
   using a video server to remove a video data section by cropping and resizing the video data wherein, the video data section comprising video data outside of the desired viewable area; and
   streaming the video data comprising the desired viewable area to the client device without streaming the video data section of the video data.

2. The method of claim 1 wherein,
   the video capture device comprises a high definition video camera; and
   the first resolution comprises a resolution of at least 720 p.

3. The method of claim 1 wherein,
   the video data in the first resolution from the video capture device comprises an amount of pixels in,
      a horizontal position, and
      a vertical position;
   determining the desired viewable area of the video data comprises:
      selecting a number of pixels less than the amount of pixels in the horizontal position of the first resolution, and
      selecting a number of pixels less than the amount of pixels in the vertical position of the first resolution; and
   streaming the video data comprising the desired viewable area to the client device without streaming the video data section of the video data comprises streaming a single video stream.

4. The method of claim 1 wherein,
   the first resolution comprises a resolution of at least 1080 p; and
   the desired viewable area comprises:
      a width of less than 1920 pixels, and
      a height of less than 1080 pixels.

5. The method of claim 1 wherein, selecting the portion of the image comprises scaling the image to a third resolution greater than the second resolution.

6. The method of claim 1 further comprising, storing the video data on a storage device after outputting the video data from the video capture device.

7. The method of claim 1, further comprising:
   changing the desired viewable area of the video data to a new desired viewable area, the new desired viewable area comprising at least part of the video data section;
   removing data outside of the second desired viewable area from the video data; and
   sending the video data comprising the new desired viewable area to the client device.

8. A video streaming system comprising:
   at least one video capture device adapted to provide a data stream, the data stream comprising video data in a first resolution;
   at least one storage device adapted to store the video data;
   at least one client device adapted to,
      receive the video data, display an image on the client device at a second resolution, wherein, the second resolution is lower than the first resolution, specify a desired viewable area of the image by,
using one or more of video width start pixel position co-ordinates, video width end pixel position co-ordinates, video height start pixel position co-ordinates, and video height end pixel position co-ordinates to provide:
a first video width start position,
a first video width end position,
a first video height start position,
a first video height end position,
one or more second video width start positions,
one or more second video width end positions,
one or more second video height start positions, and
one or more second video height end positions, wherein,
a difference between a first video width start pixel position and a first video width end pixel position comprises a first video pixel width,
a difference between a second video width start pixel position and a second video width end pixel position comprises a second video pixel width,
a difference between a first video height start pixel position and a first video height end pixel position comprises a first video pixel height,
a difference between a second video height start pixel position and a second video height end pixel position comprises a second video pixel height, and
at least one of,
the second video pixel width is less than the first video pixel width, and
the second video pixel height is less than the first video pixel height;

at least one video server communicatively coupled to the at least one storage device, the at least one server adapted to,
remove a video data section by cropping and resizing the video data, wherein, the video data section comprises video data outside of the desired viewable area, and
stream the video data comprising the desired viewable area to the client device without streaming the video data section.

9. The video streaming system of claim 8 wherein, the at least one video capture device comprises a high definition video camera; and
the first resolution comprises a resolution of at least 720 p.

10. The video streaming system of claim 8 wherein, the video data in the first resolution from the at least one video capture device comprises an amount of pixels in,
a horizontal position, and
a vertical position;
specify a desired viewable area of the image comprises:
selecting a number of pixels less than an amount of pixels in the horizontal position of the first resolution, and
selecting a number of pixels less than an amount of pixels in the vertical position of the first resolution; and
stream the video data comprising the desired viewable area to the client device without streaming the video data section comprises streaming a single video stream.

11. The video streaming system of claim 8 wherein,
the first resolution comprises a resolution of at least 1080 p; and
the desired viewable area comprises:
a width of less than 1920 pixels, and
a height of less than 1080 pixels.

12. The video streaming system of claim 8 wherein, specify the desired viewable area of the image further comprises scaling the image to a third resolution greater than the second resolution.

13. The video streaming system of claim 8, wherein, the at least one client device is further adapted to,
change the desired viewable area of the video data to a new desired viewable area, the new desired viewable area comprising at least part of the video data section;
remove data outside of the new desired viewable area from the video data; and
receive the video data comprising the new desired viewable area from the at least one video server.

14. The non-transitory, tangible computer readable storage medium, encoded with processor readable instructions to perform a method of streaming video data, the method comprising:
outputting video data in a first resolution from a video capture device;
determining a desired viewable area of the video data by,
receiving the video data at a client device,
displaying an image on the client device at a second resolution,
wherein,
the second resolution is lower than the first resolution, and
selecting a portion of the image by,
using one or more video width start pixel position co-ordinates, video width end pixel position co-ordinates, video height start pixel position co-ordinates, and video height end pixel position co-ordinates to
provide:
a first video width start position,
a first video width end position,
a first video height start position,
a first video height end position,
one or more second video width start positions,
one or more second video width end positions,
one or more second video height start positions, and
one or more second video height end positions,
wherein,
a difference between a first video width start pixel position and a first video width end pixel position comprises a first video pixel width;
a difference between a second video width start pixel position and a second video width end pixel position comprises a second video pixel width,
a difference between a first video height start pixel position and a first video height end pixel position comprises a first video pixel height,
a difference between a second video height start pixel position and a second video height end pixel position comprises a second video pixel height, and
at least one of,
the second video pixel width is less than the first video pixel width, and
the second video pixel height is less than the first video pixel height;

using a video server to remove a video data section by cropping and resizing the video data wherein, the video data section comprises video data outside of the desired viewable area; and streaming the video data comprising the desired viewable area to the client device without streaming the video data section.

15. The non-transitory, tangible computer readable storage medium, encoded with the processor readable instructions to perform the method of video streaming of claim 14, wherein,
the video capture device comprises a high definition video camera; and
the first resolution comprises a resolution of at least 720 p.

16. The non-transitory, tangible computer readable storage medium, encoded with the processor readable instructions to perform the method of video streaming of claim 14 wherein,
the video data in a first resolution from the video capture device comprises an amount of pixels in,
a horizontal position, and
a vertical position;
determining a desired viewable area of the video data comprises:
selecting a number of pixels less than the amount of pixels in the horizontal position of the first resolution, and
selecting a number of pixels less than the amount of pixels in the vertical position of the first resolution; and
streaming the video data comprising the desired viewable area to a client device without streaming the video data section comprises streaming a single video stream.

17. The non-transitory, tangible computer readable storage medium, encoded with the processor readable instructions to perform the method of video streaming of claim 14 wherein,
the first resolution comprises a resolution of at least 1080 p; and
the desired viewable area comprises:
a width of less than 1920 pixels, and
a height of less than 1080 pixels.

18. The non-transitory, tangible computer readable storage medium, encoded with the processor readable instructions to perform the method of video streaming of claim 14 wherein, selecting a portion of the image comprises scaling the image to a third resolution greater than the second resolution.

19. The non-transitory, tangible computer readable storage medium, encoded with the processor readable instructions to perform the method of video streaming of claim 14 further comprising, storing the video data on a storage device after outputting video data from the video capture device.

20. The non-transitory, tangible computer readable storage medium, encoded with the processor readable instructions to perform the method of video streaming of claim 14, further comprising:
changing the desired viewable area of the video data to a new desired viewable area, the new desired viewable area comprising at least part of the video data section;
removing data outside of the new desired viewable area from the video data;
and
sending the video data comprising the new desired viewable area to the client device.

* * * * *